United States Patent
Wu et al.

(10) Patent No.: US 12,533,578 B2
(45) Date of Patent: Jan. 27, 2026

(54) MAGNETIC SENSING SYSTEM

(71) Applicant: PIXART IMAGING INC., Hsin-Chu (TW)

(72) Inventors: Chung-Yuo Wu, Hsin-Chu (TW); Horng-Goung Lai, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 304 days.

(21) Appl. No.: 18/206,340

(22) Filed: Jun. 6, 2023

(65) Prior Publication Data

US 2024/0408482 A1 Dec. 12, 2024

(51) Int. Cl.
*A63F 13/30* (2014.01)
*A63F 13/212* (2014.01)
*A63F 13/235* (2014.01)
*G01D 5/14* (2006.01)

(52) U.S. Cl.
CPC ............ *A63F 13/30* (2014.09); *A63F 13/212* (2014.09); *A63F 13/235* (2014.09); *G01D 5/14* (2013.01)

(58) Field of Classification Search
CPC ...... A63F 13/30; A63F 13/212; A63F 13/235; G01D 5/14
See application file for complete search history.

(56) References Cited

U.S. PATENT DOCUMENTS

| | | | |
|---|---|---|---|
| 8,370,097 B2 | 2/2013 | Patel et al. | |
| 8,913,955 B1 * | 12/2014 | Mincher | H04B 5/24 455/41.1 |
| 9,360,310 B2 | 6/2016 | Tan et al. | |
| 10,393,542 B2 | 8/2019 | Funk et al. | |
| 2012/0229066 A1 | 9/2012 | Nonaka | |
| 2016/0346671 A1 * | 12/2016 | Jarchafjian | A63F 3/00694 |

FOREIGN PATENT DOCUMENTS

JP 201133609 A 2/2011

* cited by examiner

*Primary Examiner* — Robert J Michaud
(74) *Attorney, Agent, or Firm* — Li & Cai Intellectual Property (USA) Office

(57) ABSTRACT

A magnetic sensing system and a magnetic sensing input device are provided. The magnetic sensing system includes a first electronic device and a second electronic device. The first electronic device includes a first processor and a modulable magnetic source, and the first processor controls the modulable magnetic source according to predetermined information to generate a modulated magnetic field. The second electronic device includes a magnetic sensor and a second processor. The magnetic sensor detects the modulated magnetic field, and the second processor receives the detected modulated magnetic field to obtain the predetermined information.

7 Claims, 6 Drawing Sheets

MAGNETIC SENSING SYSTEM

FIELD OF THE DISCLOSURE

The present disclosure relates to a system and an input device, and more particularly to a magnetic sensing system and a magnetic sensing input device.

BACKGROUND OF THE DISCLOSURE

For users of a multimedia entertainment device connected on an audio-visual device, manual settings are usually required to achieve the best auditory and visual effects, causing a lot of inconvenience.

Furthermore, wireless input devices for the multimedia entertainment device generally utilize one or more magnetic sensors. However, the magnetic sensors are merely for positioning, this wastes tunability of magnetic field and makes the magnetic sensors too single-purpose.

SUMMARY OF THE DISCLOSURE

In response to the above-referenced technical inadequacies, the present disclosure provides a magnetic sensing system and a magnetic sensing input device capable of making the use of magnetic sensors more diversified by maximizing the use of modulable magnetic field.

In order to solve the above-mentioned problems, one of the technical aspects adopted by the present disclosure is to provide a magnetic sensing system, which includes a first electronic device and a second electronic device. The first electronic device includes a first processor and a modulable magnetic source, and the first processor is configured to control the modulable magnetic source according to predetermined information to generate a modulated magnetic field. The second electronic device includes a magnetic sensor and a second processor. The magnetic sensor is configured to detect the modulated magnetic field, and the second processor is configured to receive the detected modulated magnetic field to obtain the predetermined information.

In order to solve the above-mentioned problems, another one of the technical aspects adopted by the present disclosure is to provide a magnetic sensing system, which includes a first portable device and a host device. The first portable device includes a first processor and a first modulable magnetic source, and the first processor is configured to control the first modulable magnetic source to generate a first modulated magnetic field. The host device includes a magnetic sensor and a host processor. The magnetic sensor is configured to detect the first modulated magnetic field, and the host processor is configured to receive the detected first modulated magnetic field to identify the first modulable magnetic source, and to obtain first positioning information of the first modulable magnetic source.

In order to solve the above-mentioned problems, yet another one of the technical aspects adopted by the present disclosure is to provide a magnetic sensing input device, including a housing, a first movable member, a processor, a first modulable magnetic source and a first magnetic sensor. The first movable member is attached to the housing and being movable relative to the housing. The processor is disposed in the housing. One of the first modulable magnetic source and the first magnetic sensor is attached to the first movable member and being movable relative to the housing as the first movable member, and another one of the first modulable magnetic source and the first magnetic sensor is fixedly disposed in the housing. The processor controls the first modulable magnetic source to generate a first modulated magnetic field, the first magnetic sensor is configured to detect the first modulated magnetic field, and the processor is configured to process the detected first modulated magnetic field to identify the first modulated magnetic source, and to obtain first positioning information of the first modulated magnetic source. In response to the first movable member being moved relative to the housing, the processor detects first movement information of the first movable member according to a change of the first positioning information, and generates a first movement command correspondingly.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
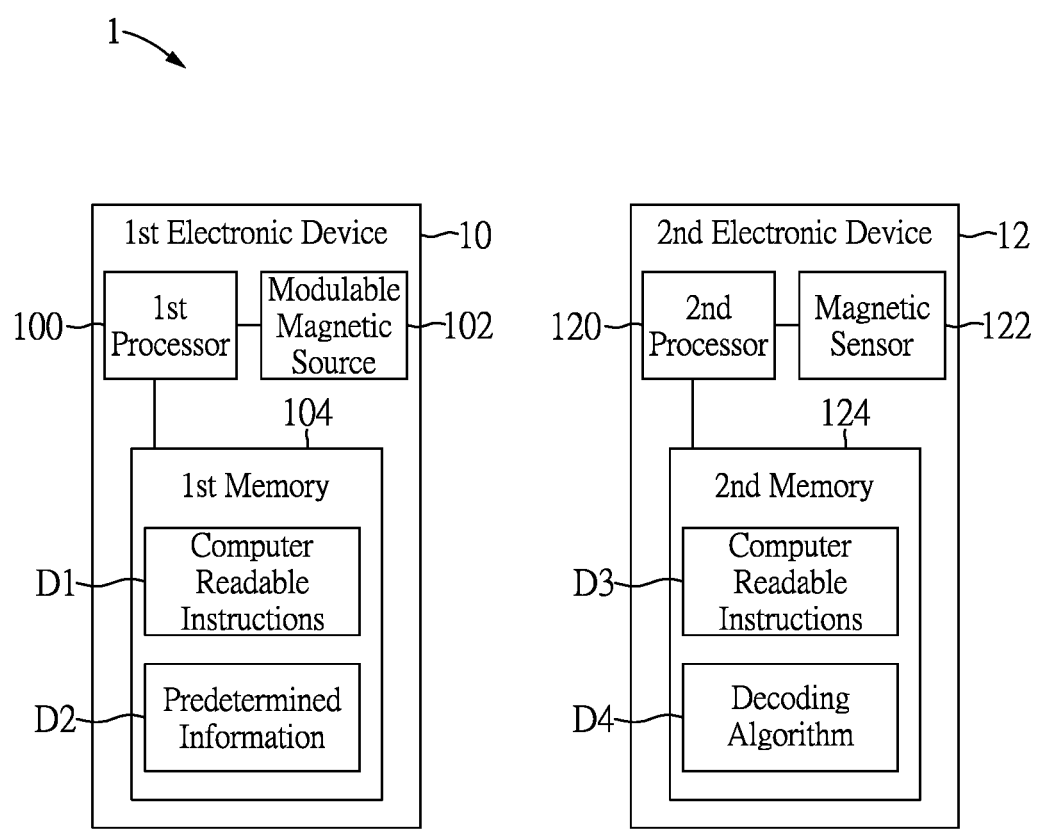
FIG. 1 is a block diagram of a magnetic sensing system according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

FIG. 1 is a block diagram of a magnetic sensing system according to a first embodiment of the present disclosure. Referring to FIG. 1, a first embodiment of the present disclosure provides a magnetic sensing system 1, which includes a first electronic device 10 and a second electronic device 12.

The first electronic device 10 can include a first processor 100, a modulable magnetic source 102 and a first memory 104 that are electrically connected to the first processor 100. The first processor 100 can be, for example, a central processing unit (CPU), a general-purpose microprocessor, a microcontroller, a digital signal processor (DSP), a field programmable gate array (FPGA), a programmable logic device (PLD) or a controller, and can be used for executing computer readable instructions D1 stored in the memory 104 that is provided for storage purposes, the memory 104 can also include both volatile and non-volatile memory.

The modulable magnetic source 102 in the first electronic device 10 is a magnetic source with modulable properties, thereby providing advantage of being able to generate a magnetic field that can be adjusted according to specific needs of the application. In some embodiments, the modulable magnetic source 102 can include a plurality of coils, for example, three coils that are perpendicular to each other, so as to be aligned along three perpendicular axes. The coils can be concentrically arranged according to a center point. Each of the coils can be controlled by the first processor 100, so as to emit a sub-magnetic field at a frequency and a strength that differs from the other coils.

In this way, the modulable magnetic source 102 can be controlled by the first processor 100 to generate a magnetic field with fixed strength, frequency and/or orientation, or generate a magnetic field with strength, frequency and/or orientation changed with time.

Since the generated magnetic field can be adjusted according to specific needs of the application, the predetermined information can therefore be appended in the magnetic field generated by the modulable magnetic source 102 in various manners. For example, the first processor 100 can be configured to encode the predetermined information according to an encoding rule, so as to generate a predetermined modulation pattern that is used to control (modulate) the magnetic field.

For example, the predetermined modulation pattern can define how the modulable magnetic source 102 can be controlled by the first processor 100 to generate a modulated magnetic field. That is to say, the predetermined modulation pattern directly or indirectly defines one or more of a frequency, a strength and an orientation of the modulated magnetic field.

Specifically, a user can carry the electronic device 12 (e.g., game controller), when the electronic device 12 is connected to the electronic device 10 (e.g., TV/game console) for the first time, the electronic device 12 can confirm a connection type (e.g., WI-FI or BLUETOOTH) and a specification (e.g., size/resolution of the display) of the electronic device 10 by detecting patterns such as a magnitude, a frequency and an azimuth of the variable magnetic source 102. In this case, the predetermined information can include hardware information of the first electronic device 10, such as relevant video and audio configurations, necessary information for establishing WI-FI or Bluetooth connection. However, the aforementioned details are disclosed for exemplary purposes only, and are not meant to limit the scope of the present disclosure.

The modulable magnetic source 102 can be configured to operate in at least two modulation modes. The first modulation mode is to provide information such as the connection type and the specification of the electronic device 10 as described above. After the electronic device 12 establishes a connection with the electronic device 10 (e.g., WIFI or Bluetooth), the modulable magnetic source 102 enters the second modulation mode. In this mode, patterns such as the magnitude/frequency/azimuth of the modulable magnetic source 102 can be used to assist positioning of the electronic device 12 to obtain a relative positional relationship between the first electronic device 10 and the second electronic device 12.

As shown in FIG. 1, the second electronic device 12 can include a second processor 120, a magnetic sensor 122 and a second memory 124, in which the magnetic sensor 122 and the second memory 12 are electrically connected to the second processor 120.

Similarly, the second processor 120 can be, for example, a central processing unit (CPU), a general-purpose microprocessor, a microcontroller, a digital signal processor (DSP), a field programmable gate array (FPGA), a programmable logic device (PLD) or a controller, and can be used for executing computer readable instructions D3 stored in the memory 124 that is provided for storage purposes, the memory 124 can also include both volatile and non-volatile memory.

The magnetic sensor 122 serves as another electronic component that involves in the data transmission between the first electronic device 10 and the second electronic device 12 through the magnetic field. This component provides the second electronic device 12 an advantage of being able to detect changes in the magnetic field and translate those changes into useful data. This feature allows for the detection of magnetic patterns and can be used for a variety of applications, such as detecting the presence of magnetic materials, measuring distances, monitoring movement, identifying devices and transmitting data.

Specifically, the magnetic sensor 122 can be configured to detect magnetic fields presented in a detection range thereof, such as the modulated magnetic field generated by the modulable magnetic source 102. The second processor 120 can be configured to obtain the predetermined information D2 in response to receiving the detected modulated magnetic field.

In some embodiments, the second processor 120 can decode the detected modulated magnetic field, by executing a decoding algorithm D4 stored in the second memory 124, to obtain the predetermined information D2. The decoding algorithm D4 is designed for decoding the detected magnetic field into the predetermined information D2 according to the encoding rule used by the first electronic device 10.

In some embodiments, the second electronic device 12 can include one or more magnetic sensors 122 that are configured to detect strength, frequency and/or orientation of the modulated magnetic field that is emitted by the modulable magnetic source 102. In some embodiments, the second electronic device 12 can further include motion, orientation, and/or inertial sensors to obtain motion, orientation, and/or inertial information, and such information and the predetermined information D2 can be jointly processed by the second processor 120 to determine and track a location and an orientation of the second electronic device 12 with respect to the first electronic device 10.

Figure 2:
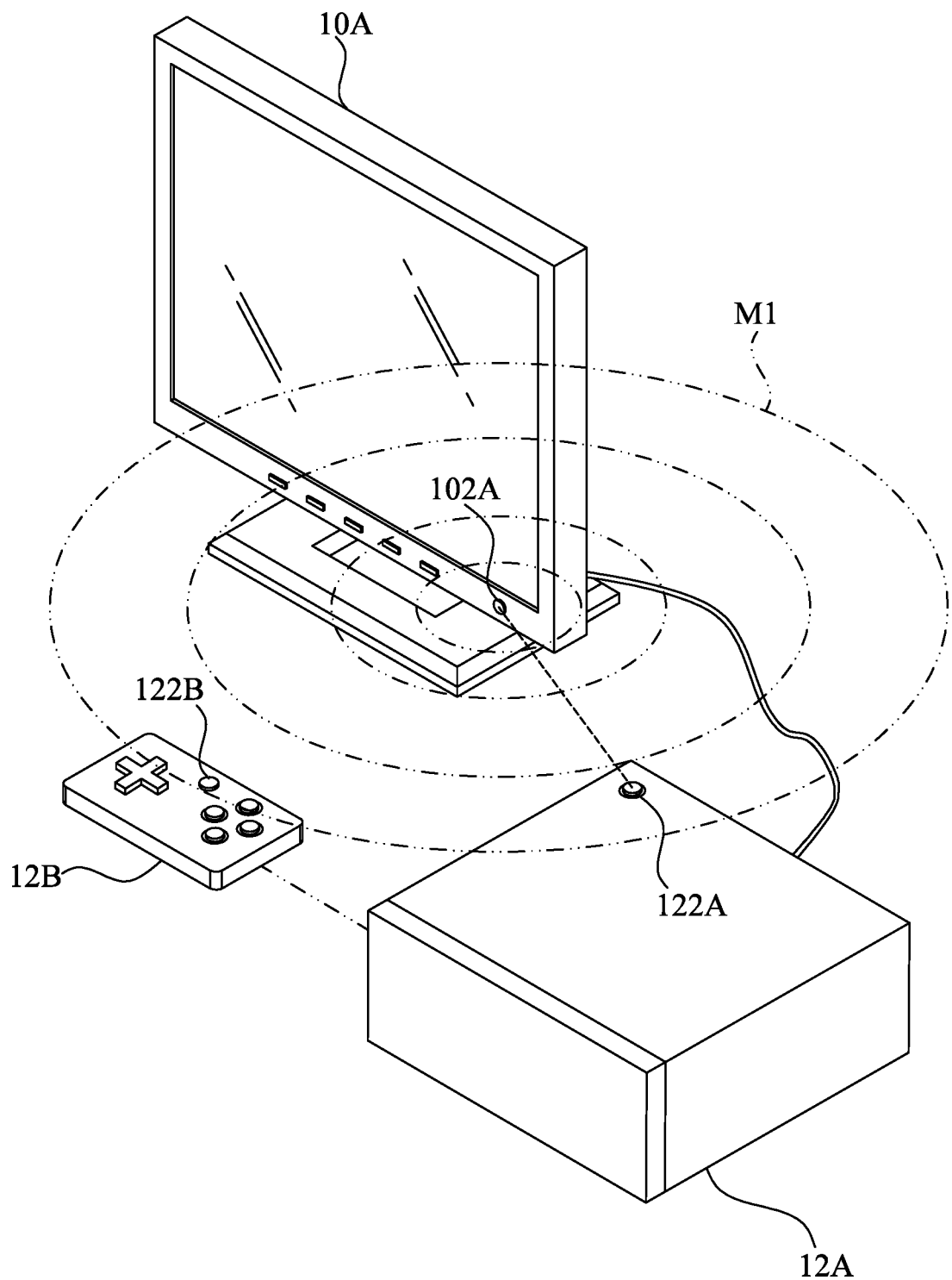
FIG. 2 is a schematic diagram showing an example of the magnetic sensing system according to the first embodiment of the present disclosure.

Reference is made to FIG. 2, which is a schematic diagram showing an example of the magnetic sensing system according to the first embodiment of the present disclosure. In FIG. 2, the magnetic sensing system 1 can include a device 10A, a console 12A and a controller 12B. The device 10A has a modulable magnetic source 102A, and the console 12A and the controller 12B have sensors 122A and 122B, respectively.

Therefore, the first electronic device 10 of FIG. 1 can be the device 10A, and the second device 12 can be the console 12A or the controller 12B.

In a first case, the console 12A can be a game console, the modulation magnetic source 102 can be provided in the device 10A or the console 12A, and the sensor 122 can be built in the controller 12B or the console 12A.

That is, the first electronic device 10 can be the device 10A or the console 12A, and thus the first processor 100 can be built in the device 10A or the console 12A. When the first processor 100 is provided in the console 12A, the predetermined information D2 can be transmitted through a wired connection or a wireless connection between the device 10A and the console 12A.

In a second case, the console 12A can be a cloud server, the modulable magnetic source 102 can be provided in the device 10A, and the magnetic sensor 122 can be built in the controller 12B. After the device 10A is connected to the controller 12B, the controller 12B can provide a cloud streaming address while the device 10A is merely used to stream video (e.g., gaming screens). Computations of the gaming screens or motions can be performed by the cloud server (console 12A), and the modulable magnetic source 102 can be configured to transmit the predetermined information D2 that indicates a streaming status (e.g., disconnection and/or bad connection quality) between the device 10A and the console 12A to the controller 12B through, for example, the second modulation mode mentioned above.

In the first case, the first electronic device 10 can be the device 10A or the console 12A, and thus the first processor 100 can be provided in the device 10A or the console 12A. When the first processor 100 is provided in the console 12A, the predetermined information D2 can be obtained through a wired connection or a wireless connection between the device 10A and the console 12A.

For the second case, the first electronic device 10 can be the device 10A or the console 12A, and similarly, the modulable magnetic source 102 can be provided in the device 10 or the console 12A.

In FIG. 2, the device 10A can be an audio-visual device (e.g., TV or display), and the first processor 100 obtains one or more of a video configuration and an audio configuration of the device 10A from the predetermined information D2, and to control the modulable magnetic source 102 according to the one or more of the video configuration and the audio configuration to generate the modulated magnetic field M1.

In some embodiments, the predetermined information D2 can include hardware information corresponding to the device 10A, such as a display size, suitable resolutions, types and/or configurations of speakers. The corresponding video configuration can be the best resolution that can be used by the console 12A for displaying the video game.

In addition to the hardware information, the predetermined information D2 can include information that indicates a connection manner between the controller 12B and the device 10 or between the controller 12B and the console 12A. In this case, the device 10A can detect a position of the controller 12B to obtain a distance between the device 10A and the controller 12B and/or a direction of the controller 12B relative to the device 10A, and can be used to control the modulable magnetic source 102 to adjust the modulated magnetic field M1. Alternately, the device 10A/console 12A can be configured to detect change of position of the controller 12B or change of distance from the controller 12B, or the controller 12B can be configured to track change of a position or change of a distance with respect to the device 10A/console 12A.

In these cases, the magnetic sensor 122A or the magnetic sensor 122B can be configured to detect the modulated magnetic field M1, and the second processor 120 can obtain the predetermined information D2, such as the video configuration and/or the audio configuration in response to receiving the modulated magnetic field M1.

Therefore, in response to obtaining the video configuration and/or the audio configuration, the console 12A can be configured to output the video signals to the device 10A according to the video configuration and/or the audio configuration for the first case mentioned above. For the second case, the console 12A can stream the video signals to the device 10A in response to obtaining the video configuration and/or the audio configuration from the controller 12B according to the video configuration and/or the audio configuration.

Alternatively, the second electronic device 12 can also be, for example, the controller 12B with the magnetic sensor 122B. In this case, the controller 12B can be communicatively connected to the console 12A, and the magnetic sensor 122B can be configured to detect the modulated magnetic field M1, the second processor 120 is now provided in the controller 12B for obtaining the predetermined information D2. Therefore, after the predetermined information D2 is obtained by the second processor 120, the predetermined information D2 can be further transmitted to the console 12A for outputting the video signals.

Therefore, the magnetic sensing system 1 provided by the present disclosure makes good use of tunability of the magnetic field, thereby providing a variety of applications for the modulable magnetic source-sensor architecture among the electronic devices.

Furthermore, in the magnetic sensing system 1 provided by the present disclosure, best auditory and visual effects can be achieved by utilizing magnetic-field-involved automatic setting mechanism among electronic devices, which is even more convenient for the users.

Second Embodiment

Figure 3:
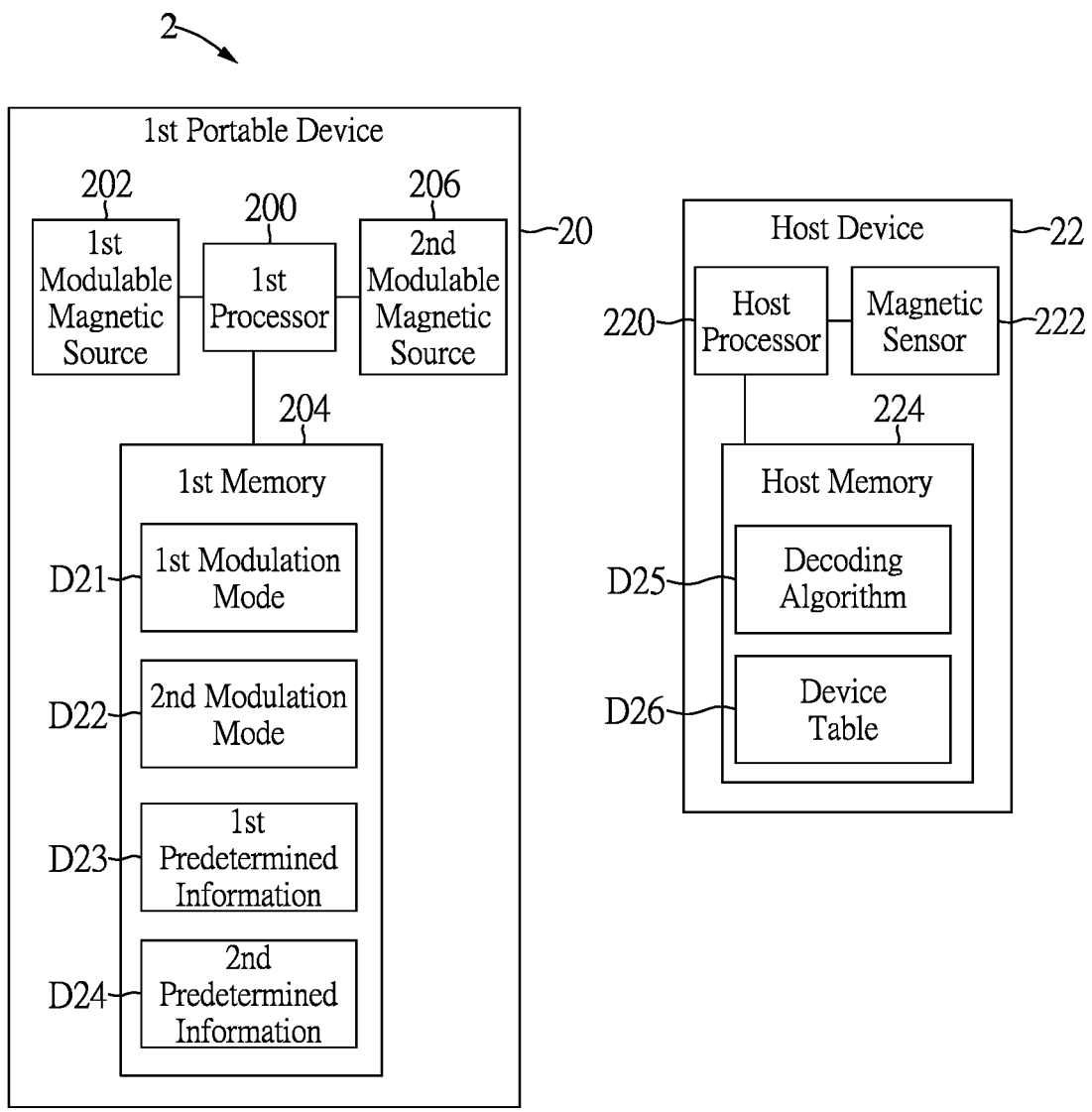
FIG. 3 is a first block diagram of the magnetic sensing system according to a second embodiment of the present disclosure.
Figure 4:
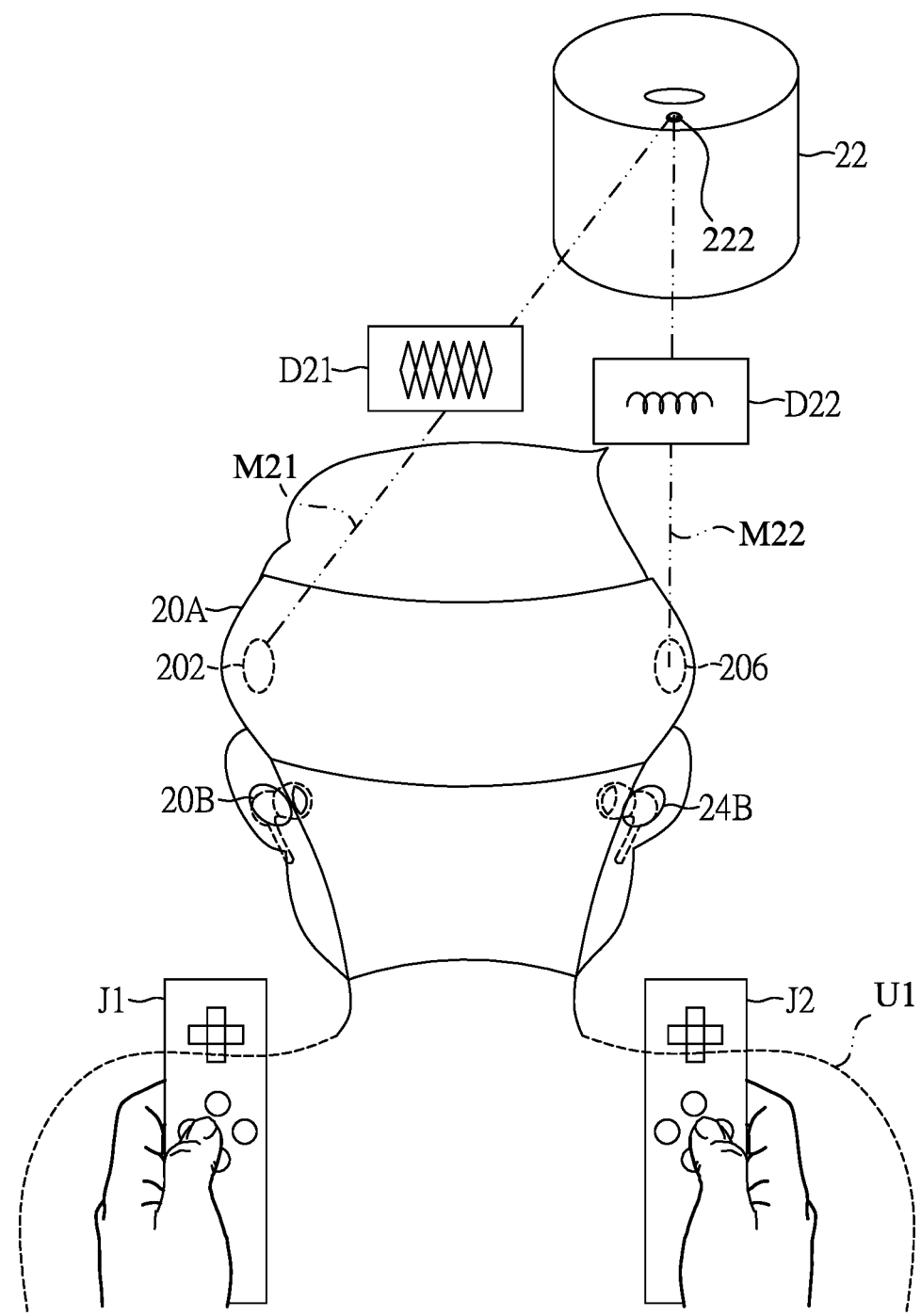
FIG. 4 is a schematic diagram showing examples of the magnetic sensing system according to the second embodiment of the present disclosure.

FIG. 3 is a first block diagram of a magnetic sensing system according to a second embodiment of the present disclosure, and FIG. 4 is a schematic diagram showing examples of the magnetic sensing system according to the second embodiment of the present disclosure. Referring to FIGS. 3 and 4, a second embodiment of the present disclosure provides a magnetic sensing system 2, which includes a first portable device 20 and a host device 22. It should be noted that elements in this embodiment similar to the first embodiment are referred to by similar reference numerals, and repeated descriptions thereof are omitted.

In this embodiment, the first portable device 20 includes a first processor 200, a first modulable magnetic source 202, a first memory 204 and a second modulable magnetic source 206. The first modulable magnetic source 202, the first memory 204 and the second modulable magnetic source 206 are electrically connected to the first processor 200.

Similar to the first electronic device mentioned in the first embodiment, the first processor 200 can be configured to control the first modulable magnetic source 202 to generate a first modulated magnetic field M21, and control the second modulable magnetic source 206 to generate a second modulated magnetic field M22.

Specifically, the first modulable magnetic source 202 and the second modulable magnetic source 206 can be configured in different ways, so as to transmit identification information corresponding to the first modulable magnetic source 202 and the second modulable magnetic source 206, and the transmitted identification can be used to identify the first modulable magnetic source 202 and the second modulable magnetic source 206 once received.

In some embodiments, the first processor 200 can control the first modulable magnetic source 202 to generate the first modulated magnetic field M21 with a first modulation mode D21, and control the second modulable magnetic source 206 to generate the second modulated magnetic field M22 with a second modulation mode D22. The first modulation mode D21 and the second modulation mode D22 are similar to the predetermined modulation pattern mentioned in the first embodiment, and each directly or indirectly defines one or more of a frequency, a strength and an orientation of the modulated magnetic field. It should be noted that the first modulation mode is different from the second modulation mode, such that the generated first and second modulated magnetic fields M21 and M22 can be used to identify different magnetic sources.

In some embodiments, the first processor 200 can be configured to determine the first modulation mode D21 according to first predetermined information D23, and determine the second modulation mode D22 according to second predetermined information D24. It should be noted that the first predetermined information D23 and the second predetermined information D24 can be, for example, unique serial numbers corresponding to the first modulable magnetic source 202 and the second modulable magnetic source 206, and can be stored in the first memory 204. The encoding rule mentioned in the first embodiment can be similarly utilized in the present embodiment to determine the first modulation mode D21 and the second modulation mode D22, which can also be stored in the first memory 204.

Referring to FIG. 3, the host device 22 includes a host processor 220, a magnetic sensor 222 and a host memory 224.

In FIGS. 3 and 4, the magnetic sensor 222, which is similar to the magnetic sensor 122 in the first embodiment, can be configured to detect the first modulated magnetic field M21 and the second modulated magnetic field M22. The host processor 220, which is similar to the second processor 120 mentioned in the first embodiment, can be configured to receive the detected first modulated magnetic field M21 to identify the first modulable magnetic source 202, and to the detected second modulated magnetic field M22 to identify the second modulable magnetic source 206.

In detail, in response to receiving the detected first modulated magnetic field M21 and the detected second modulated magnetic field M22 from the magnetic sensor 222, the host processor 220 can decode the detected first modulated magnetic field M21 and the detected second modulated magnetic field M22, by executing a decoding algorithm D25 stored in the host memory 224, to obtain the first predetermined information D23 and the second predetermined information D24.

Next, the host processor 220 can identify the first modulable magnetic source 202 and the second modulable magnetic source 206 according to a device table D26 stored in the host memory. The device table D26 is a table that defines correspondences between multiple devices and identification information. For example, the first predetermined information D23 and the second predetermined information D24 can be identification information corresponding to the first modulable magnetic source 202 and the second modulable magnetic source 206, therefore, the host processor 220 can obtain devices, such as the first modulable magnetic source 202 and the second modulable magnetic source 206, that respectively correspond to the first predetermined information D23 and the second predetermined information D24 from the device table D26.

On the other hand, the host processor 220 can be further configured to obtain first positioning information of the first modulable magnetic source 202 and second positioning information of the second modulable magnetic source 206, by analyzing the detected first modulated magnetic field M21 and the detected second modulated magnetic field M22. For example, the host processor 220 analyzes the detected first modulated magnetic field M21 to obtain a strength and an orientation of the first modulable magnetic source 202.

Afterward, the strength and the orientation can be compared to Earth's magnetic field (also known as the geomagnetic field), that is, the first positioning information can be obtained by comparing the strength and the orientation of the detected first modulated magnetic field M21 with the strength and the orientation of the geomagnetic field, and so forth, the second positioning information of the second modulable magnetic source 206 can be similarly obtained. The mechanisms mentioned in the present embodiment can be utilized in various applications.

As shown in FIG. 4, the first portable device 20 can be a wearable device, such as a head-mounted display (HMD) device 20A, the first modulable magnetic source 202 and the second modulable magnetic source 206 can be arranged inside a housing of the HMD device 20A in a predetermined arrangement. For example, the first modulable magnetic source 202 and the second modulable magnetic source 206 can be arranged on two opposite inner sides of the housing, respectively.

When a user U1 places the wearable device on a body part of the user, such as placing the HMD device 20A on the head of the user U1, since the first modulable magnetic source 202 and the second modulable magnetic source 206 can be identified and their position information can also be obtained through the magnetic sensor 222, the host processor 220 can be configured to obtain a direction and a position of the body part (e.g., head) according to the first positioning information and the second positioning information. It should be noted that movements of the first modulable magnetic source 202 and the second modulable magnetic source 206 can be obtained by performing continuous detection for a period of time, and thus a movement of the wearable device (HMD device 20A) can also be obtained.

Figure 5:
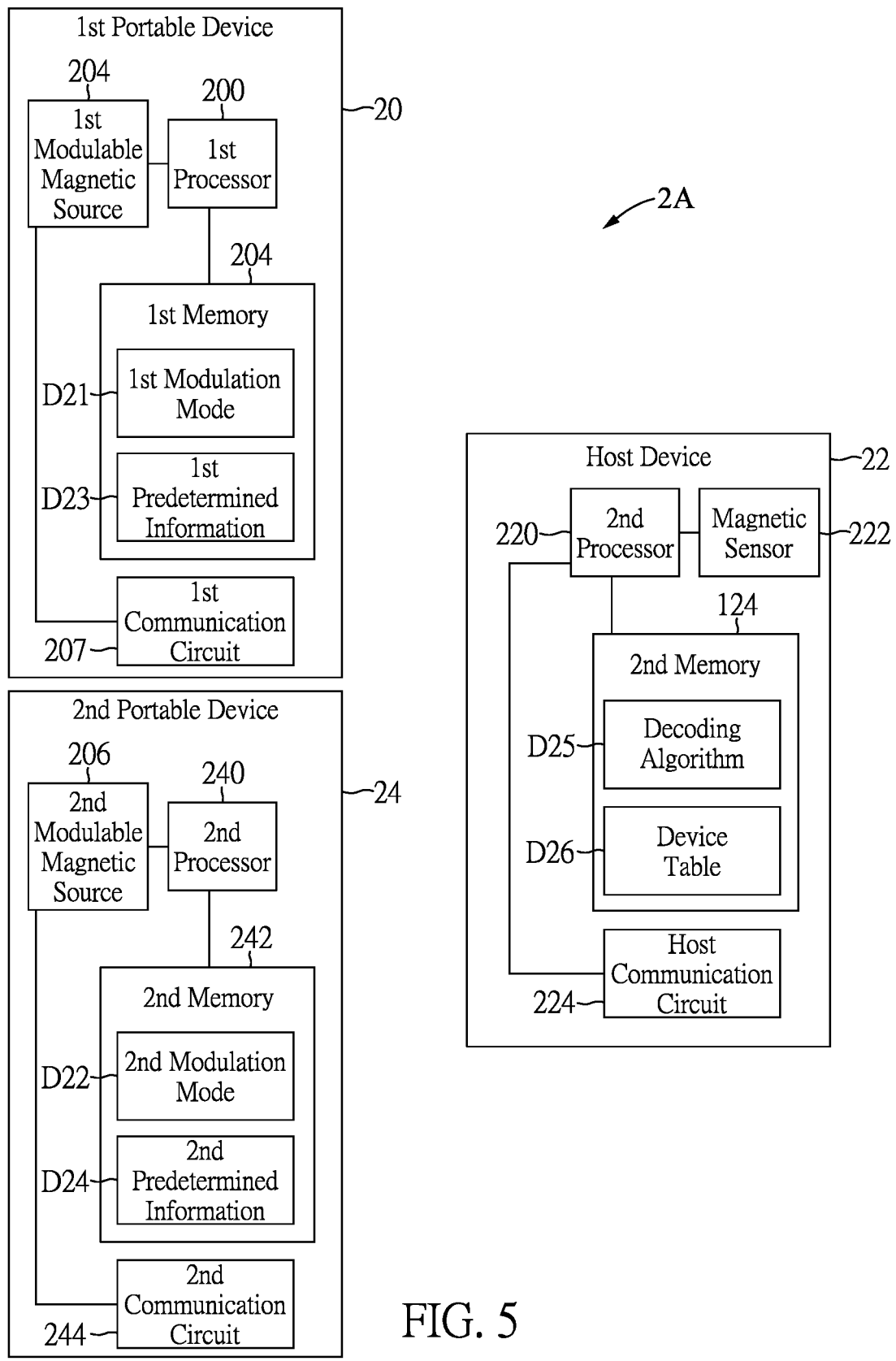
FIG. 5 is a second block diagram of the magnetic sensing system according to a second embodiment of the present disclosure.

Reference can be made to FIG. 5, which is a second block diagram of a magnetic sensing system according to a second embodiment of the present disclosure.

In FIG. 5, the second modulable magnetic source 206 is moved to another device, and the second predetermined information D24 and the second modulation mode D22 are also stored in a memory of the another device.

As shown in FIG. 5, the magnetic sensing system 2A further includes a second portable device 24. The second portable device 24 includes a second processor 240 similar to the first processor 200 and the second modulable magnetic source 206, the second processor 240 controls the second modulable magnetic source 206 to generate the second modulated magnetic field M22. It should be noted that elements in this embodiment similar to the first embodiment are referred to by similar reference numerals, and repeated descriptions thereof are omitted.

Specifically, an architecture of FIG. 5 can be utilized in other applications different from those of FIG. 3. For example, as shown in FIG. 4, the first portable device 20 is a left earphone 20B, the second portable device 24 is a right earphone 24B.

When the user U1 wears the left-ear earphone 20B and the right earphone 24B on the head of the user U1, the first processor 200 can control the first modulable magnetic source 202 to generate the first modulated magnetic field M21 with the first modulation mode D21, and the second processor 240 can control the second modulable magnetic source 206 to generate the second modulated magnetic field M22 with a second modulation mode D22.

Similar to the identification mechanism mentioned above, the host processor 220 can identify the left earphone 20B and the right earphone 24B according to the detected first modulated magnetic field M21 and the second modulated magnetic field 22, and then obtain a direction and a position of the head of the user according to the first positioning information and the second positioning information, as used in the embodiment of the HMD device 20A.

In certain embodiments, as shown in FIG. 4, the first portable device 20 can be a first gamepad J1, and the second portable device 24 can be a second gamepad J2. When the user U1 holds the first gamepad J1 and the second gamepad J2 with the user's hands and the first modulated magnetic field M21 and the second modulated magnetic field M22 are generated, the host processor 220 can identify the first gamepad J1 and the second gamepad J2 according to the detected first modulated magnetic field M21 and the second modulated magnetic field 22, and then obtain directions and positions of both hands according to the first positioning information and the second positioning information, and such positioning information can be further utilized to recognize a gesture of the user U1.

In some embodiments, the host device 22 further includes a host communication circuit 224, the first portable device includes a first communication circuit 207, and the second portable device includes a second communication circuit 244. These communication circuits can be configured to communicatively connect with one another, and can support multiple wireless protocols, and can be used to transmit wireless signals with different operating frequencies. In addition, the above-mentioned protocols can include, for example, a wireless communication standard, such as IEEE 802.11, 3G/4G/5G standards.

When a first user using the first portable device (e.g., the first gamepad J1) and a second user using the second portable device (e.g., the first gamepad J1), the host device 22 sends reconfiguration requests to the first portable device 20 and the second portable device 24, respectively, so as to request the first processor 200 and the second processor 240 to use different modulation patterns to respectively control the first modulable magnetic source 202 and the second modulable magnetic source 206.

For example, in a case that only one user is using the first portable device 20 and the second portable device 24, the host device 22 can interact with the first portable device 20 and the second portable device 24 with a one-user configuration, in which functions and/or operations are performed according to a one-user scenario. In another case that two users using the first portable device 20 and the second portable device 24, the host device 22 sends the reconfiguration requests to change operation modes of the first portable device 20 and the second portable device 24 to adapt to a two-user configuration, in which functions and/or operations are performed according to a two-user scenario.

Therefore, the magnetic sensing systems 2 and 2A provided by the present disclosure make good use of tunability of the magnetic field, thereby providing a variety of applications by identifying multiple modulable magnetic sources among the electronic devices.

Third Embodiment

Figure 6:
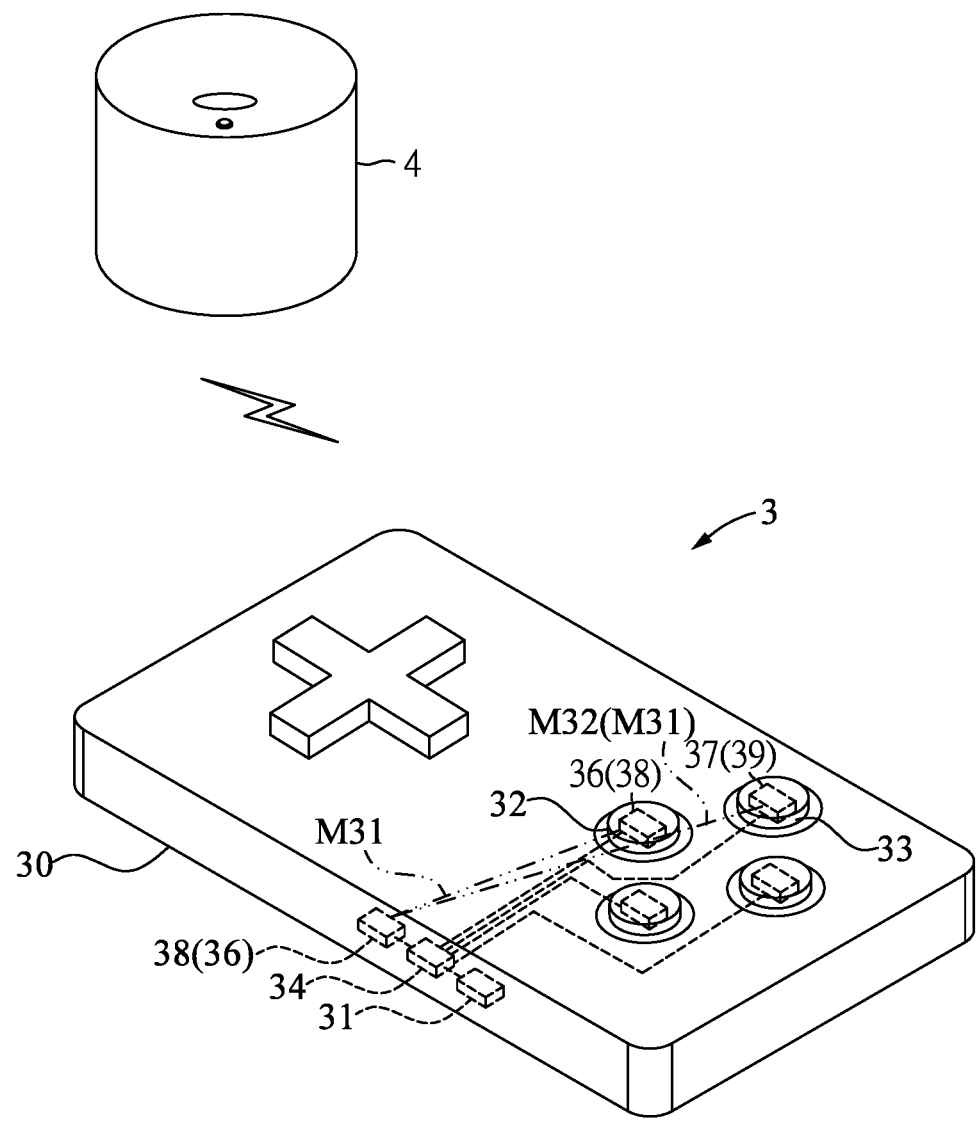
FIG. 6 is a schematic diagram of a magnetic sensing input device according to a third embodiment of the present disclosure.

FIG. 6 is a schematic diagram of a magnetic sensing input device according to a third embodiment of the present disclosure. Referring to FIG. 6, a third embodiment of the present disclosure provides a magnetic sensing input device 3, which includes a housing 30, a first movable member 32, a processor 34, a first modulable magnetic source 36 and a first magnetic sensor 38. As shown in FIG. 6, the magnetic sensing input device 3 can be a gamepad, but the present disclosure is not limited thereto.

The first movable member 32 can be, for example, a first button, which is attached to the housing 30 and being movable relative to the housing 30.

The processor 34 is disposed in the housing 30, and for example, the processor 34 can be a central processing unit (CPU), a general-purpose microprocessor, a microcontroller, a digital signal processor (DSP), a field programmable gate array (FPGA), a programmable logic device (PLD) or a controller. In some embodiment, one of the first modulable magnetic source 36 and the first magnetic sensor 38 is attached to the first movable member 32 and being movable relative to the housing 30 as the first movable member 32, and another one of the first modulable magnetic source 36 and the first magnetic sensor 38 is fixedly disposed in the housing 30.

In the embodiment shown in FIG. 6, the first magnetic source 36 is attached to the first movable member 32 and can be movable relative to the housing 30 as the first movable member 32, the first magnetic sensor 38 is fixedly disposed in the housing 30.

In this case, the processor 34, which is electrically connected to the first magnetic source 36 and the first magnetic sensor 38, can be configured to control the first modulable magnetic source 36 to generate a first modulated magnetic field M31. The first magnetic sensor 38 can detect the first modulated magnetic field M31, and the processor 34 processes the detected first modulated magnetic field M31 to identify the first modulated magnetic source 36.

Similar to the second embodiment, first positioning information of the first modulated magnetic source 36 can therefore be obtained by the processor 34. When the first movable member 32 is moved relative to the housing 30, for example, a user press the first button, the processor 34 can detect first movement information of the first movable member 32 according to a change of the first positioning information, and generates a first movement command correspondingly.

As shown in FIG. 6, the magnetic sensing input device 3 further include a second movable member 33 (e.g., a second button) and a second modulable magnetic source 37. The second movable member 33 is attached to the housing 30 and is movable relative to the housing 30. The second modulable magnetic source 37 is attached to the second movable member 33 and being movable relative to the housing 30 as the second movable member 33.

Similarly, the processor 34 can control the second modulable magnetic source 37 to generate a second modulated magnetic field M32, the first magnetic sensor 38 detects the second modulated magnetic field M32, and the processor 34 processes the detected second modulated magnetic field M32 to identify the second modulable magnetic source 37, and to obtain second positioning information of the second modulable magnetic source.

In is conceivable that when the second movable member 37 is moved relative to the housing 30 (e.g., the second button is pressed by the user), the processor 34 can detect second movement information of the second movable member 33 according to a change of the second positioning information, and generates a second movement command correspondingly.

In the present embodiment, multiple modulable magnetic sources are provided for one magnetic sensor, however, a scheme in which multiple magnetic sensors can be provided for one modulable magnetic source is applicable for the magnetic sensing input device 3 in the present disclosure.

In this case, arrangements of the first magnetic source 36 and the first magnetic sensor 38 should be exchanged, and the second modulable magnetic source 37 should be replaced by a second magnetic sensor 39. Therefore, the first magnetic source 36 is fixedly disposed in the housing 30, and the first magnetic sensor 38 is attached to the first movable member 32 and can be movable relative to the housing 30 as the first movable member 32.

Furthermore, the second magnetic sensor 39 is attached to the second movable member 33 and can be movable relative to the housing 30 as the second movable member 30. The first magnetic sensor 38 and the second magnetic sensor 39 can detect the first modulated magnetic field M31, and the processor 34 processes the detected first modulated magnetic field M31 from the first magnetic sensor 38 to obtain positioning information of the first movable member 32, and processes the detected first modulated magnetic field M31 from the second magnetic sensor 39 to obtain positioning information of the second movable member 33.

Therefore, when the first movable member 32 or the second movable member 33 is moved relative to the housing 30, the processor 34 can detect the first movement information of the first movable member 32 or second movement information of the second movable member 33 according to a change of the first positioning information or the second positioning information, and generates a first or second movement command correspondingly.

Furthermore, the magnetic sensing input device 3 further includes a communication unit 31 communicatively connected to a host device 4 (e.g., a game console). The communication unit 31 can be a communication circuit that can support multiple wireless protocols, and can be used to transmit wireless signals with different operating frequencies. In addition, the above-mentioned protocols can include, for example, a wireless communication standard, such as IEEE 802.11, 3G/4G/5G standard.

In response to generating the first and/or second movement command, the communication unit 31 can be configured, by the processor 34, to transmit one or more of the first movement command and the second movement command to the host device 4, such that the host device 4 can respond to the first movement command or the second move command to execute a first move operation or a second move operation. It should be noted that each movable member can also be a knob or a joystick generally provided with the gamepad, therefore, a variety of commands can be generated by using the architecture mentioned in the present embodiment.

Beneficial Effects of the Embodiments

In conclusion, the magnetic sensing system provided by the present disclosure makes good use of tunability of the magnetic field, thereby providing a variety of applications for the modulable magnetic source-sensor architecture among the electronic devices, and providing a variety of applications by identifying multiple modulable magnetic sources among the electronic devices.

Furthermore, in the magnetic sensing system provided by the present disclosure, best auditory and visual effects can be achieved by utilizing magnetic-field-involved automatic setting mechanism among electronic devices, which is even more convenient for the users.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A magnetic sensing system, comprising:
a first electronic device including a first processor and a modulable magnetic source, wherein the first processor is configured to control the modulable magnetic source according to predetermined information to generate a modulated magnetic field;
wherein the first electronic device is an audio-visual device;
wherein the first processor is configured to obtain one or more of a video configuration and an audio configuration of the audio-visual device by analyzing the predetermined information, and to control the modulable magnetic source according to the one or more of a video configuration and an audio configuration to generate the modulated magnetic field.

2. The magnetic sensing system according to claim 1, wherein the first electronic device further includes a memory configured to store the predetermined information.

3. The magnetic sensing system according to claim 1, further comprising a second electronic device including a magnetic sensor configured to detect the modulated magnetic field and a second processor that is configured to receive the detected modulated magnetic field to obtain the predetermined information; wherein, in response to receiving the predetermined information, the second processor is further configured to set the game console according to the one or more of the video configuration and the audio configuration according to the predetermined information.

4. The magnetic sensing system according to claim 1, wherein the first processor is configured to encode the predetermined information to generate a predetermined modulation pattern, and modulate the modulable magnetic source with the predetermined modulation pattern to generate the modulated magnetic field.

5. The magnetic sensing system according to claim 4, further comprising a second electronic device including a magnetic sensor configured to detect the modulated magnetic field and a second processor that is configured to receive the detected modulated magnetic field to obtain the predetermined information; wherein the second processor is configured to decode the detected modulated magnetic field to obtain the predetermined information.

6. The magnetic sensing system according to claim 5, wherein the predetermined information include hardware information corresponding to the first electronic device.

7. The magnetic sensing system according to claim 4, wherein the predetermined modulation pattern defines one or more of frequency, strength and directivity of the modulated magnetic field.

\* \* \* \* \*